3,523,804
METHOD OF PRODUCING HEAT-FUSED CAST REFRACTORY PRODUCT HAVING CaO AND MgO AS ITS PRINCIPAL CONSTITUENTS
Yukio Fukatsu, 1439 2-chome, Setagaya, Setagaya-ku, Tokyo, Japan, and Kazuyuki Iida, 2441 Nakatohara, Kawashima-cho, Hodogaya-ku, Yokohama, Japan
No Drawing. Filed Aug. 8, 1967, Ser. No. 659,032
Int. Cl. C04b 35/04, 35/06
U.S. Cl. 106—58        9 Claims

ABSTRACT OF THE DISCLOSURE

Cast refractory product of CaO-MgO system, in which the content of CaO plus MgO is above 85% by weight analysis and $SiO_2$ content is below 8% by weight analysis, is produced by melting raw refractory materials of various kinds in the presence of metal, casting and resolidifying the molten materials.

BACKGROUND OF THE INVENTION

Field of the invention

The present invention relates to a method of producing basic heat-fused cast refractory products, and more particularly, relates to a method of producing heat-fused cast refractory products containing CaO and MgO as the principal constituents.

Description of the prior art

In general, a refractory product having CaO and MgO as its principal constituents has been widely known as a dolomite refractory product since old times. Dolomite refractory product is used, particularly for making steel furnaces, e.g., oxygen steel making furnaces, basic open hearth furnaces, Bessemer converters, electric furnaces, and ladles. In addition, they have been widely adopted for the use in the manufacture of cement firing kilns and also furnace materials useful in the chemical industry.

However, these dolomite refractory products are non-uniform in composition and unstable in the structure, because they are bonded refractory products which are manufactured by firing or unfiring. They entail chemical and mechanical defects in the bonding part. Further, an important problem lies in the fact that since the dolomite bonded refractory product possesses high permeability, it is likely to absorb moisture or humidity and frequently causes slaking.

On the other hand, when such bonded refractory products are heat-fused and cast, they are found to show better properties.

As is well known, a fused, cast refractory is the type of refractory product commonly produced by melting refractory material of desired composition and then casting the molten refractory material into a mold to solidify and form any particular shape desired as predetermined by the mold cavity.

As fused cast refractory materials, materials of $$Al_2O_3\text{-}SiO_2$$

system, a $MgO\text{-}Al_2O_3$ system, a $Al_2O_3\text{-}ZeO_3\text{-}SiO_2$ system and a $Cr_2O_3\text{-}Al_2O_3\text{-}MgO\text{-}Fe_2O_3$ system are presently and been widely used.

However, fused-cast refractory products having as principal constituents CaO and MgO have not yet been adopted practically, despite the fact these products are provided with distinct and particular characteristics in comparison with bonded refractory products.

In regard to heat-fused cast refractory products of a CaO-MgO system, a few compositions have hitherto been made but have not yet proved good enough for use.

This is due to the phenomenon called "bulge" (which is further described later), which does not substantially take place in cast refractory products of other systems.

This problem is the one which could not be solved, for instance, by the limitation of principal constituents consisting of CaO, MgO, $SiO_2$, nor by the addition of specific oxides.

Bulging is the convexity phenomenon which occurs chiefly in the neighbourhood of the center of cast refractory material by some causes (see various possible causes shown in the description of examples set forth hereinafter). This phenomenon becomes an important cause which prevents cast products of the CaO-MgO system from becoming dense, concretely speaking especially since the phenomenon makes cast refractory products porous and degrades corrosion resistance against the molten slag.

BRIEF SUMMARY OF THE INVENTION

The present invention was completed after numerous experiments were made with regard to the aforementioned problems.

Namely, the present invention solves various problems which arise in cast refractory products, by imparting each condition described below:

(a) Metal is to be added as an addition agent or agents;
(b) The metal to be added is one or more than two of metals selected from the group consisting of Fe, Al, Cr, Ti, Mg, Ca, Sn, Zr, Mn, Si, Co and Ni;
(c) The proportion of metal to be added is to be selected so that each proportion of metals may be in a predetermined range, at the time of the production of heat-fused cast refractory products of CaO-MgO system which contain at least above 85% of CaO+MgO and below 8% of $SiO_2$, on the basis of an oxide analysis, wherein CaO ranges from 90 to 10% of CaO+MgO and MgO ranges from 10 to 90% of CaO+MgO.

Furthermore, according to the present invention, it has also been found that a further better result can be obtained by using halides, together with the addition of metals.

A principal object of the present invention is to provide heat-fused cast refractory products of CaO-MgO system free from the bulge phenomenon.

Another object of the present invention is to provide dense heat-fused cast refractory products of CaO-MgO system.

Still another object of the present invention is to provide fused cast refractory products of CaO–MgO system having superior corrosion-erosion resistance.

A further object of the present invention is to provide fused cast refractory products of CaO-MgO system having superior slacking resistance.

Still further object of the present invention is to provide fused cast refractory products of CaO-MgO system having excellent compressive strength.

Yet another object of the present invention is to provide fused cast refractory products of a high purity CaO-MgO system.

Other objects and advantageous features will be apparent from the following description of the invention.

DETAILED DESCRIPTION OF THE INVENTION INCUDING PREFERRED EMBODIMENTS

As is well known, fused cast refractory products are of a texture wherein various raw refractory materials are completely melted and resolidified to produce various interlocking crystals, the clearances of which are filled with a glassy phase and/or fine crystals, respectively called a matrix. In the refractory products produced in the present invention, a greater proportion of crystals is crystal of CaO and MgO. Depending on the compounding ratio of raw refractory materials, working condition or the like, there may be produced crystals of 3 CaO·SiO$_2$, 2 CaO·SiO$_2$, 3 CaO·2SiO$_2$ or CaO·MgO·SiO$_2$. Moreover, 2 CaO·MgO·Fe$_2$O$_3$ or the like is produced in case of the presence of Fe.

Comparing a cast refractory product with a bonded refractory product, the former is generally more superior to the latter in corrosion resistance and slaking resistance. However, in castings of refractory products, the matrix portions filling clearances between crystals are in general liable to be corroded by various corrosion agents. Therefore, every possible care should be paid to the matrix portion in order to sufficiently utilize characteristic features of crystal parts.

In the present invention, it has been found from numerous experiments that strict limitation is necessary with regard to SiO$_2$, Fe$_2$O$_3$ (FeO) or the like as components to form their matrix. Namely, in fused cast refractory products produced by the present method, the total of CaO and MgO should be above 85% by weight (in the present specification, all proportions will be shown hereinafter by weight proportion, except where otherwise stated), preferably above 90%. According to the present method, SiO$_2$ does not affect corrosion resistance more remarkably than Fe$_2$O$_3$ (it exists also in the form of FeO as Fe oxide, and the state of presence in cast product varies with the difference in condition of melting, and in the present invention, all Fe is converted into Fe$_2$O$_3$ and shown in the form of Fe$_2$O$_3$), but maximum of SiO$_2$ is 8% in the cast product, and particularly it needs to be limited from 0.5 to 5%.

On the other hand, Fe$_2$O$_3$ is below 6%, and particularly preferable from 0.5 to 3.0%. Namely, the excessive presence of SiO$_2$ and/or Fe$_2$O$_3$ increases excessively the necessary amount of matrix formation and low melting substance, causing a lowering of the corrosion resistance of the refractory product.

Thus, the total of CaO and MgO should be above 85%, particularly it should be above 90%, and limitation is also required respectively to CaO and MgO. For instance, when MgO is excessive, the melting point becomes remarkably high at the time of the fusion and it becomes substantially difficult from both operational and technical points of view.

On the other hand, with respect to the extreme case of CaO, up to nearly 100% of CaO can be made present by removing the impurities inevitably entered from raw material, but there is a problem of slaking phenomenon. Namely, with the cast product, even if nearly 100% of CaO is present, its slaking phenomenon occurs thin from the surface and slowly. Accordingly, there is no occurrence of such a phenomenon as moisture from water vapor penetrating into the interior of the refractory product and thus, effecting disintegration not only at the surface, but also largely from the interior portion, as seen in case of the bonded refractory products. Further, in order to prevent the slaking phenomenon from occuring on the outer surface, a short interval of reservation after production, or the preservation after necessary surface-treatment, becomes necessary.

From the above-mentioned facts, it is preferable that for the proportions of CaO and MgO in the cast product, CaO range from 90 to 10% by weight of the total of CaO and MgO, while MgO ranges from 10 to 90% by weight of the total, and preferably CaO ranges from 75 to 35%, and MgO ranges from 25 to 65% for the total of CaO and MgO. Furthermore, for slaking resistance, according to the method of the present invention, it is a fundamental problem, to control each component in the above-mentioned ranges, although it may be also improved to some extent by substances to be added as described below.

In case where the corrosion resistance and slaking resistance are essentially considered, such a condition is required. Moreover, it has been found from the results of various experiments that on these fundamental bases the accomplishment of the dense cast product including the aforesaid objects can be more accelerated.

The present invention successfully prevents the above described cast refractory product of CaO-MgO system from bulging by using a metal or metals as addition agents upon the basis of the limitation of these components.

In the present invention, addition agents such as metals, halogen components and oxides are generally added to the batch of various raw refractory materials and are mixed with these raw materials, and are sometimes added to the melt material in an electric furnace. In any case, additive agents as mentioned above are added before casting in the mold.

In the following, the present invention will be further described with reference to examples which are illustrative but not limiting. Furthermore, in this specification, the amounts of addition agents to be added, such as metals, raw halogen materials and oxides are shown in parts by weight relative to 100 parts of all raw refractory materials except addition agents, calculated as oxide.

Example 1

Raw refractory materials used in the present invention are chiefly limestone, unslaked lime, slaked lime, dolomite, magnesia clinker, magnesite, magnesium hydroxide, dunite, serpentine, talc, wollastonite and quartzite or the like, among which the most optimum are unslaked lime, magnesia clinker and dolomite. Several analytical values of raw materials are as follows:

Unslaked lime

| | Percent |
|---|---|
| CaO | 90–97 |
| MgO | 0.8–2.1 |
| SiO$_2$ | 0.9–5.0 |
| Al$_2$O$_3$ | 0.4–2.8 |
| Fe$_2$O$_3$ | 1.1–5.9 |
| Others | below 0.5 |

Magnesia clinker

| | Percent |
|---|---|
| MgO | 85–96 |
| CaO | 1.0–2.6 |
| SiO$_2$ | 2.3–5.5 |
| Fe$_2$O$_3$ | 0.6–4.9 |
| Al$_2$O$_3$ | 0.3–2.0 |
| Others | below 0.5 |

Calcined dolomite

| | Percent |
|---|---|
| MgO | 31–40 |
| CaO | 56–66 |
| SiO$_2$ | 1.1–3.5 |
| Fe$_2$O$_3$ | 0.6–0.9 |
| Al$_2$O$_3$ | 0.1–0.5 |
| Others | below 2.5 |

Quartzite

| | Percent |
|---|---|
| SiO$_2$ | 97–99 |
| Fe$_2$O$_3$ | 0.3–0.6 |
| Al$_2$O$_3$ | 0.4–1.0 |
| Others | below 2.5 |

All sorts of raw materials were respectively proportioned to provide the desired final composition, and then charged in an electric arc furnace. Generally the electric furnace is lined with a refractory material similar to the refractory material to be melted.

The raw refractory materials charged in the electric arc furnace were melted for 1.5 hours at 3000° C. max. The molten raw refractory materials are cast into a hexahedron-shaped mold having an inner volume of 130 mm.

x 230 mm. x 540 mm. As a material of the mold, graphite or cast iron is generally used.

Melt analyses are as follows:

TABLE 1

| Sample | MgO | CaO | SiO₂ | Fe₂O₃ | Al₂O₃ | Others |
|---|---|---|---|---|---|---|
| P 1 | 50.32 | 47.53 | 1.57 | 0.40 | 0.11 | 0.07 |
| P 2 | 31.71 | 62.85 | 3.82 | 1.31 | 0.20 | 0.11 |

In the present specification, specimens of the fused cast product are shown by P and S, but these shown by P are for the sake of comparison and outside the range of the subject of the present invention. Accordingly, Table 1 does not show the cast product of the present invention. These P1 and P2 are of superior properties and possible to be employed for certain uses. However, they are not sufficient for developing effectively the characteristic feature as a cast refractory product. This fact is apparent from the comparison of them with the refractory product cast in accordance with the present invention.

Analytical values, together with kinds of metals used and proportions thereof of the cast products manufactured in accordance with the present invention, wherein metals are mixed with raw refractory materials as addition agents and treated in similar steps, are shown below:

(NOTE 1): when it is intended to get a predetermined shape of cast product for an object of the invention, the rate of bulging indicates the degree of the convexity of the volume of the cast products and is in the value of $$\frac{V-V_0}{V} \times 100$$

wherein $V_0$ is volume of the object and
$V$ volume of the product.

(NOTE 2): the corrosion resistance was tested by the following method:

A crucible consisting of each specimen and converter slag (CaO 52.0%, SiO₂ 12.7%, Al₂O₃ 3.2%, MgO 2.1%, MnO 6.8%, P₂O₅ 2.7%, Fe₂O₃ 22.8%) was put in said crucible, which was rotated at speeds of 3 r.p.m. for 10 hours. That shown in Table 2 was the depth of corrosion of slag in mm. unit when the abovementioned operation was carried out at 1,700° C.

(NOTE 3): the sample was respectively placed in the room (temperature 25° C., humidity 65%) and in the vapor (temperature 30° C., humidity 85%) and the period of time until the disintegration started to occur was shown by month.

As shown in Table 3, P1 and P2 show a higher degree

TABLE 2

| Specimen | CaO | MgO | SiO₂ | Fe₂O₃ | Al₂O₃ | Others | Kinds of metals added in accordance with the present invention and the added amounts (in parts by weight relative to 100 parts of all raw materials except the metals, calculated as oxide) |
|---|---|---|---|---|---|---|---|
| S1-1 | 37.80 | 58.01 | 2.06 | 1.94 | 0.10 | 0.09 | Fe, 0.4 part. |
| S2-1 | 47.75 | 48.44 | 2.10 | 0.77 | 0.91 | 0.03 | Al, 0.4 part. |
| S3 | 57.32 | 36.06 | 0.87 | 1.66 | 4.03 | 0.6 | Fe, 0.5 part+Al, 2.0 parts. |
| S4 | 50.07 | 40.28 | 4.02 | 1.09 | 0.11 | SnO₂, 4.37; others 0.06 | Sn, 4.0 parts. |
| S5 | 61.14 | 34.03 | 2.85 | 0.75 | 0.09 | Cr₂O₃, 1.01; others 0.13 | Si, 0.5 part+Cr, 0.8 part. |
| S6 | 72.06 | 21.27 | 2.00 | 0.81 | 0.16 | ZrO₂, 3.56; others 0.14 | Zr, 3.0 parts. |
| S7 | 50.43 | 46.46 | 1.69 | 1.01 | 0.13 | MnO₂, 2.20; others 0.88 | Mn, 1.4 parts. |
| S8 | 13.49 | 80.35 | 1.75 | 1.45 | 0.11 | NiO, 2.45; others 0.40 | Ni, 2.4 parts. |
| S9 | 42.70 | 51.26 | 1.88 | 1.15 | 0.11 | CoO, 2.37; others 0.53 | Co, 2.3 parts. |
| S10 | 47.85 | 45.61 | 5.22 | 0.85 | 0.09 | 0.38 | Si, 1.2 parts. |
| S11 | 54.03 | 40.13 | 1.51 | 1.35 | 0.13 | Cr₂O₃, 2.54; others 0.31 | Cr, 2.0 parts. |
| S12 | 31.38 | 62.37 | 1.05 | 1.49 | 0.14 | TiO₂, 2.72; others 0.45 | Ti, 1.5 parts. |

Analytical values stated herein are all shown in oxide form, but partly contained in the cast product in the form of metal, but all such are shown as converted in oxide.

All metals shown in examples have a high purity of over 97% and have been mixed in a batch of raw materials as powders below 48 mesh.

Further, metals are generally blended in powders. Sometimes, they are used in the form of small pieces, fine chips, and small masses.

Various properties of the cast products shown in Table 1 and 2 are summarized in Table 3.

of bulge in comparison with S1–S12. Accordingly, the former are evidently inferior to the latter in both corrosion and slaking resistance.

Considering the effect of the addition of metal in the field of cast refractory products, the effect can be clarified only by practical experiments, and the theory and experimental results are not coincident. Hence, the reasons are difficult to grasp definitely, but the following matters can be considered.

Referring to the reasons for the phenomenon of bulge, the largest reasons are due to gases, such as oxygen, water

TABLE 3

| Specimen | True specific gravity | Refractoriness (SK) | (Note 1) Rate of bulging (percent) | (Note 2) Corrosion resistance (mm.) | (Note 3) Slaking resistance in the— Room (month) | Vapor (month) | Compressive strength (kg./cm.²) |
|---|---|---|---|---|---|---|---|
| P1 | 3.45 | ¹41 | 12–13 | 3.9 | 4.5 | 1.1 | ¹1,300 |
| P2 | 3.48 | ¹41 | 11–12 | 3.9 | 4.1 | 1.2 | ¹1,300 |
| S1-1 | 3.43 | ¹41 | 1–2 | 2.0 | 8.0 | 3.0 | ¹1,500 |
| S2-1 | 3.44 | ¹41 | 1–2 | 1.9 | 8.1 | 3.2 | ¹1,500 |
| S3 | 3.44 | ¹41 | 1–2 | 1.9 | 8.0 | 2.7 | ¹1,500 |
| S4 | 3.47 | ¹41 | 1–2 | 2.1 | 9.1 | 3.1 | ¹1,500 |
| S5 | 3.48 | ¹41 | 1–2 | 1.9 | 7.2 | 2.3 | ¹1,500 |
| S6 | 3.42 | ¹41 | 1–2 | 2.0 | 7.9 | 2.5 | ¹1,500 |
| S7 | 3.43 | ¹41 | 1–2 | 1.8 | 8.0 | 3.0 | ¹1,500 |
| S8 | 3.44 | ¹41 | 2–3 | 2.0 | 9.3 | 3.0 | ¹1,500 |
| S9 | 3.45 | ¹41 | 2–3 | 2.1 | 8.6 | 2.6 | ¹1,500 |
| S10 | 3.41 | ¹41 | 1–2 | 2.4 | 10.8 | 3.3 | ¹1,500 |
| S11 | 3.42 | ¹41 | 1–2 | 1.3 | 9.1 | 3.0 | ¹1,500 |
| S12 | 3.43 | ¹41 | 1–2 | 1.9 | 9.2 | 3.1 | ¹1,500 |

¹ Up.

vapor or the like. The deliberation of such gases arises from the difference between solubilities of gas of the melt and solid material, followed by the solidification of molten materials. A relatively large cavity is believed to be formed in the cast refractory product due to such gases. On the other hand, molten substances composed of compositions, such as remarkably strong basic CaO and MgO absorb gases easily. Consequently, in the composition of the present invention, the evolution of gases is considered to be remarkably high.

Metals used in the present invention form oxides by reaction with gases such as oxygen or the like. Namely, it seems to act as a reducing agent and thereby prevents the cast product from bulging.

As metals used in the present invention, Fe and Al are most preferred. Moreover, Mg and Ca are used (see Table 7), in addition to Cr, Ti, Mn, Si, Sn, Zr, Ni and Co shown in Table 2. In particular, Mg and Ca are suitable for providing cast refractory products of a CaO-MgO system of high purity.

The effective quantity of metal to be added varies more or less with the kind of metals, manufacturing steps and the like, but is substantially similar.

In the case of Fe, $Fe_2O_3$ in the cast refractory product is below 6.0%, preferably below 3.0% as described above. Accordingly the proportion of Fe to be added as metal is below 5 parts, preferably below 3.0 parts relative to 100 parts of all raw refractory materials except metals, calculated as oxide, even in consideration of a part of them being lost or diluted.

In general, the effective amount of metal added is in the range satisfying the following formula:

$$0.005 < \Sigma \frac{Yn}{A \cdot Wn} < 0.1$$

(preferably 0.01) $n=$(i), (ii), (iii), . . . (xii) wherein each $Yn$, $A \cdot Wn$ and (i), (ii), (iii), . . . (xii) means the following matters:

$Yn$ indicates the amount to be added as metal of metal $n$ shown in the proportion relative to 100 parts of all raw refractory materials except metals, calculated as oxide;
$A \cdot Wn$ indicates an atomic weight of metal $n$ and (i), (ii), (iii), . . . (xii) indicate respectively twelve kinds of metals (Fe, Al, Cr, Ti, Mn, Si, Zr, Sn, Mg, Ca, Co and Ni).

TABLE 4

| Metal: | $Yn$ (percent by weight) |
|---|---|
| Fe | 0.28–5.6 |
| Al | 0.13–2.7 |
| Cr | 0.26–5.2 |
| Ti | 0.24–4.8 |
| Mg | 0.17–3.4 |
| Ca | 0.20–4.0 |
| Sn | 0.58–11.9 |
| Zr | 0.45–9.1 |
| Mn | 0.27–5.5 |
| Si | 0.14–2.8 |
| Co | 0.29–5.9 |
| Ni | 0.29–5.9 |

In the present invention, when each metal is compared by weight, the amount to be added varies depending on the kind of metal. Accordingly, when Sn is used in a maximum, Sn is sometimes present as oxide in the order of 15% in the cast refractory product. When consideration is paid that the ratio of CaO+MgO in the cast product may be above 85%, preferably above 90% it is not preferable to use an abundance of Sn.

In the present invention, it is also possible to use more than two metals in combination. Therefore, even when the amount of a certain metal to be added is below the amount shown in Table 4, the amount is effective if the total amount of more than two of metals is in the range satisfying the above-mentioned formula. On the other hand, in regard to a certain metal, when that metal is added up to the upper limit shown in Table 4, a simultaneous use of other metals should be avoided. In general, one kind of metal is used.

Excessive addition of metal causes inferior properties in the refractory product. This is believed due to the fact that the amount of metal remaining in the refractory product as metal increases and that the oxide formed in abundance causes matrix inferiority.

Further, alkali metal cannot be used. On the other hand, Ce, B, V or the like cannot be used in the industry, because they are expensive, but their effect is acknowledged. The results of Fe (metallic Fe) and Al (metallic Al) which are most preferred metals are shown in Tables 5 and 6.

TABLE 5

| Specimen | Chemical Analysis | | | | | | Metal to be added and amount thereof |
|---|---|---|---|---|---|---|---|
| | MgO | CaO | $SiO_2$ | $Fe_2O_3$ | $Al_2O_3$ | Others | |
| P3–1 | 47.20 | 49.91 | 0.02 | 0.68 | 0.12 | 0.07 | Fe, 0.05 part. |
| S1–1 | 58.01 | 37.80 | 2.06 | 1.94 | 0.10 | 0.09 | Fe, 0.4 part. |
| S1–2 | 32.07 | 63.21 | 2.00 | 2.06 | 0.11 | 0.55 | Fe, 1.2 parts. |
| S1–3 | 70.21 | 20.96 | 5.32 | 2.31 | 1.01 | 0.19 | Fe, 1.7 parts.+Al, 0.3 part. |
| P3–2 | 47.33 | 42.90 | 1.85 | 6.64 | 0.30 | 0.98 | Fe, 4.5 parts. |
| P4–1 | 49.67 | 47.20 | 2.05 | 0.80 | 0.09 | 0.19 | Al, 0.02 part. |
| S2–1 | 48.44 | 47.75 | 2.10 | 0.77 | 0.91 | 0.03 | Al, 0.4 part. |
| S2–2 | 34.31 | 53.92 | 4.89 | 1.07 | 5.75 | 0.06 | Al, 2.5 parts. |
| P4–2 | 33.01 | 53.75 | 1.42 | 1.04 | 10.63 | 0.16 | Al, 5.1 parts. |
| P5 | 43.19 | 41.50 | 12.30 | 1.69 | 0.87 | 0.45 | Fe, 0.9 part. |

TABLE 6

| Specimen | True specific gravity | Refractoriness (SK) | Rate of bulging (percent) | Corrosion resistance (mm.) | Slaking resistance in— | | Compressive strength (kg./cm.²) |
|---|---|---|---|---|---|---|---|
| | | | | | Room (month) | Vapor (month) | |
| P3–1 | 3.44 | ¹41 | 8–9 | 2.9 | 5.1 | 1.4 | ¹1,400 |
| S1–1 | 3.43 | ¹41 | 1–2 | 2.0 | 8.1 | 3.0 | ¹1,500 |
| S1–2 | 3.42 | ¹41 | 1–2 | 1.9 | 9.0 | 3.3 | ¹1,500 |
| S1–3 | 3.46 | ¹41 | 1–2 | 2.4 | 9.8 | 3.4 | ¹1,500 |
| P3–2 | 3.44 | ¹41 | 2–3 | 4.5 | 8.0 | 2.9 | ¹1,500 |
| P4–1 | 3.42 | ¹41 | 9–10 | 1.9 | 5.2 | 1.4 | ¹1,400 |
| S2–1 | 3.44 | ¹41 | 1–2 | 1.8 | 8.1 | 3.0 | ¹1,500 |
| S2–2 | 3.43 | ¹41 | 1–2 | 2.8 | 9.1 | 3.3 | ¹1,500 |
| P4–2 | 3.44 | ¹41 | 2–3 | 10.8 | 8.7 | 3.0 | ¹1,500 |
| P5 | 3.44 | ¹41 | 1–2 | 4.9 | 8.8 | 3.0 | ¹1,500 |

¹ Up.

The results in the case where Ca and Mg are used as the metal are shown in Tables 7 and 8. Mg and Ca are the metals constituting MgO and CaO which are the principal constituents of the cast refractory product. Hence, it is possible to produce cast refractory products of CaO-MgO system with high purity by using high purity raw refractory materials of CaO and MgO. Furthermore, Ca has been added in small mass to the melt material in an electric furnace after the fusing treatment of raw refractory materials is completed.

ing as an anion in the replaced form of $OH^-$ ion caused to generate due to the moisture contained in the melt and is considered as a result to make the cast refractory product dense.

As halogen components to be used, $CaF_2$, $CaCl_2$, $AlF_3$, NaF, $MgCl_2$, $MgF_2$, $BaF_2$, NaCl, KCl, $AlCl_3$ and other alkali metals, alkaline earth metals, and aluminum halides are favorable. These halides should be appropriately used because of each differs in decomposition temperature and boiling point. For instance, $CaF_2$ possesses a high boiling

TABLE 7

| Specimen | Chemical composition of cast refractory product | | | | | | Metal to be added and its proportion (based on 100 parts of new materials) |
|---|---|---|---|---|---|---|---|
| | MgO | CaO | $SiO_2$ | $Fe_2O_3$ | $Al_2O_3$ | Others | |
| S13 | 51.71 | 46.45 | 0.69 | 0.98 | 0.11 | 0.06 | Mg, 1.4 parts. |
| S14 | 13.78 | 83.12 | 2.02 | 0.87 | 0.10 | 0.11 | Ca, 2.3 parts. |

TABLE 8

| Specimen | True specific gravity | Refractoriness (SK) | Rate of bulging (percent) | Corrosion resistance (mm.) | Compressive strength (kg./cm.²) |
|---|---|---|---|---|---|
| S13 | 3.45 | ¹41 | 1-2 | 1.5 | ¹1,500 |
| S14 | 3.40 | ¹41 | 1-2 | 1.4 | ¹1,500 |

¹ Up

EXAMPLE 2

Refractory product of CaO-MgO system is produced in a similar method as Example 1. In this case, however in addition to the metal, halogen components are used to addition agents and the results thereof are as follows:

point of the order of 2500° C., as is suitable for the manufacture of the opitmum cast product. Namely, those halogen components which are stable even at a relatively high temperature, are suitable. In this regard since $NH_4Cl$ is easy to decompose, care should be taken at the time of use. Even when $NH_4Cl$ is decomposed, $Cl^-$ acts as halogen instantaneously and imparts the effect to the cast product.

As halogen components, F and Cl are suitable, and especially F is appropriate. As a halide, this compound is generally used as chemicals or mineral containing halogen components. In practice, $CaF_2$ (fluorite) is the most suitable. On the other hand, even when halogen itself is

TABLE 9

| Specimen | Analysis of cast product | | | | | | | | Addition agents and added amount (based on 100 parts of all raw materials) |
|---|---|---|---|---|---|---|---|---|---|
| | MgO | CaO | $SiO_2$ | $Fe_2O_3$ | $Al_2O_3$ | F | Cl | Others | |
| S15 | 36.63 | 58.04 | 1.61 | 1.90 | 0.10 | 1.17 | | 0.55 | Fe, 1.6 parts+fluorite ($CaF_2$, 98.1 percent) 2.8 parts. |
| S16 | 54.04 | 40.79 | 2.05 | 0.78 | 1.89 | | 0.33 | 0.12 | Al, 1.0 part+$MgCl_2$, 1.8 parts. |
| S17 | 46.49 | 49.15 | 1.84 | 0.85 | 0.08 | 0.90 | | 0.69 | Mg 1.0, part+$CaF_2$, 2.8 parts. |
| S18 | 32.30 | 60.37 | 0.68 | 2.26 | 1.72 | 2.44 | | 0.05 | Fe, 0.9 part+$AlF_3$, 4.8 parts. |
| S19 | 51.02 | 45.46 | 1.14 | 1.03 | 0.96 | | 0.20 | 0.09 | Al, 0.3 part+Fe, 0.5 part +$CaCl_2$, 1.4 parts. |

TABLE 10

| Specimen | True specific gravity | Refractoriness (SK) | Rate of bulging (percent) | Corrosion resistance (mm). | Slaking resistance in— | | Compressive strength (kg./cm.²) |
|---|---|---|---|---|---|---|---|
| | | | | | Room (month) | Vapor (month) | |
| S15 | 3.44 | ¹41 | Below 1% | 1.5 | 9.9 | 3.6 | ¹1,500 |
| S16 | 3.38 | ¹41 | ...do | 1.6 | 9.8 | 3.4 | ¹1,500 |
| S17 | 3.40 | ¹41 | ...do | 1.6 | 10.1 | 3.6 | ¹1,500 |
| S18 | 3.45 | ¹41 | ...do | 1.6 | 10.2 | 3.7 | ¹1,500 |
| S19 | 3.46 | ¹41 | ...do | 1.5 | 9.9 | 3.6 | ¹1,500 |

¹Up.

In the production of cast refractory products of CaO-MgO system, it is most desirable to jointly utilize the effects of metal and the effects of halogen. The effect is especially high when Fe is used as metal and $CaF_2$ (fluorite) as halogen.

Here, considering the effects of halogen, the effect of halogen is not evident as much as the effect of metal. Now, the following can be considered. Namely, the metal so-to-speak is considered to the effect that it reacts with gas such as oxygen in the molten substance as a reducing agent to prevent the bulge, whereas the halogen is existing in a gas state (in this case, halogen gas is blown into the melt in the furnace), it provides the desired effect. However, this method is not suitable in practice.

The effective amount added of halogen components is in such a range that the halogen is contained in an amount of 0.1 to 3.0% in the refractory cast product. During manufacture, raw halogen material is decomposed, with the result that halogen dissipates partially. However, the amount of halogen remaining in the cast product is seldom reduced to below 40% in the case of fluoride on the basis of halogen. In an addition where the residual amount is below 0.1%, the effect is less, while an excessive addition degrades the property of the matrix.

EXAMPLE 3

The results obtained in simultaneous use of metal and oxide in a similar method are shown in Tables 11 and 12.

$Yn$ indicates the amount of metal $n$ shown in the proportion relative to 100 parts of all raw refractory materials except the metals, calculated as oxide, $A \cdot Wn$ indicates the atomic weight of metal $n$ and (i), (ii) . . . (xii) indicate respectively said at least one metal.

TABLE 11

| Specimen | Analytical value of cast refractory product | | | | | | Addition agents and amount added (based on 100 parts of raw materials) |
|---|---|---|---|---|---|---|---|
| | CaO | MgO | SiO$_2$ | Fe$_2$O$_3$ | Al$_2$O$_3$ | Others | |
| S20 | 46.25 | 47.08 | 2.03 | 0.89 | 0.11 | MnO$_2$, 2.60; CeO$_2$, 0.98; others, 0.06 | CeO$_2$, 1 part+Mn, 2.2 parts. |
| S21 | 56.80 | 33.17 | 4.86 | 2.32 | 0.08 | TiO$_2$, 2.25; others, 0.52 | TiO$_2$, 2.3 parts+Si, 2.3 parts. |
| S22 | 47.45 | 44.64 | 1.64 | 0.62 | 3.76 | V$_2$O$_5$, 1.64; others, 0.24 | V$_2$O$_5$ 1.8, parts+Al, 2.2 parts. |
| S23 | 46.29 | 45.09 | 1.42 | 1.33 | 0.08 | B$_2$O$_3$, 5.30; others, 0.49 | Boric acid, 10.1 parts+Fe, 0.8 part. |
| S24 | 33.85 | 58.09 | 1.69 | 2.41 | 0.09 | Cr$_2$O$_3$, 3.69; others, 0.18 | Cr$_2$O$_3$, 3.8 parts+Fe, 1.4 parts. |
| S25 | 50.06 | 39.36 | 3.88 | 1.37 | 0.12 | ZrO$_2$, 4.65; SnO$_2$, 0.46; others, 0.10 | ZrO$_2$, 0.9 part+SnO$_2$, 0.5; part +ZrO$_2$, 3 parts. |

TABLE 12

| Specimen | True specific gravity | Refractoriness (SK) | Rate of bulging (percent) | Corrosion resistance (mm.) | Slaking resistance in— | | Compressive strength (kg./cm.$^2$) |
|---|---|---|---|---|---|---|---|
| | | | | | Room (month) | Vapor (month) | |
| S20 | 3.45 | ¹41 | 1-2 | 1.8 | 11.0 | 3.8 | ¹1,500 |
| S21 | 3.46 | ¹41 | 1-2 | 2.0 | 10.3 | 3.6 | ¹1,500 |
| S22 | 3.44 | ¹41 | 1-2 | 2.0 | 10.1 | 3.5 | ¹1,500 |
| S23 | 3.42 | ¹41 | 1-2 | 1.6 | 11.2 | 3.9 | ¹1,500 |
| S24 | 3.45 | ¹41 | 1-2 | 1.8 | 10.9 | 3.7 | ¹1,500 |
| S25 | 3.46 | ¹41 | 1-2 | 1.9 | 11.4 | 4.0 | ¹1,500 |

As is apparent from Table 12, each specimen from S20 to S25 shows an excellent slaking resistance. The greater part of metals added according to the present invention is present in the cast product as oxide. As a consequence, it is quite obvious that the addition of the metal would contribute to the elimination of bulge from the cast product and simultaneously to improvement in the slaking resistance of the cast product. As a result of a series of experiments, it has been found that the most excellent slaking resistance can be imparted to the cast product by the presence of one or more than two oxides, such as SnO$_2$, CeO$_2$, ZrO$_2$, TiO$_2$, V$_2$O$_5$, B$_2$O$_3$ and Cr$_2$O$_3$.

The effect of oxide is considered to be based on the stabilization of free CaO existing in the cast product.

The effect of the oxide can be recognized when the aforesaid oxide is present from 0.3 to 7.5% in the cast product. The presence of 0.5 to 5.4% gives an especially favorable result.

According to the present invention, various shaped cast refractory products can be obtained.

The cast refractory products cast in accordance with the present invention may also be used after pulverization. Namely, pulverized raw materials are preferred as raw materials for fired or unfired refractory products. Further, the pulverized raw materials are effectively used as a stamping material or raw material for mortar, in place of natural dolomite.

What we claim is:

1. A method of producing dense heat-fused cast refractory product containing oxides of calcium and magnesium as its principal constituents, comprising the steps of heat-fusing, casting and resolidifying raw refractory materials in which chemical analytical values are 90 to 10% CaO, 10 to 90% MgO, 0.5 to 5% SiO and 0.5 to 3% Fe$_2$O$_3$, the total of said CaO plus MgO being above 85%, by weight in the cast refractory product, characterized by adding at least one metal selected from the group consisting of Fe, Al, Cr, Ti, Mg, Ca, Sn, Zr, Mn, Si, Co and Ni to the said raw refractory materials at least before casting and in a proportion that the amount of said metal should satisfy the formula:

$$0.005 < \Sigma \frac{Yn}{A \cdot Wn} < 0.1$$

$n = $ (i), (ii), . . . (xii), wherein:

2. A method according to claim 1, wherein the chemical analytical values of CaO is from 75% to 35% by weight of the total of CaO+MgO.

3. A method according to claim 1, wherein also is added at least before casting, a halogen component, said halogen component being present in the cast refractory product as halogen in an amount of from 0.1% to 3% by weight.

4. A method according to claim 3, wherein the halogen is a member selected from the group consisting of fluorine and chlorine.

5. A method according to claim 1, wherein chemical analytical values are above 90% of the total of CaO plus MgO, by weight, in the cast refractory product.

6. A method according to claim 2, wherein said metal is Fe and chemical analytical values are above 90% of the total of CaO plus MgO, by weight, in the cast refractory product.

7. A method according to claim 2, wherein said metal is Al and chemical analytical values are above 90% of the total of CaO plus MgO, by weight, in the cast refractory product.

8. A method according to claim 3, wherein said metal is Fe and said halogen is fluorine.

9. A method according to claim 1, wherein there is also added at least before casting about 0.3%–7.5% of, at least one oxide selected from the group consisting of CeO$_2$, ZrO$_2$, TiO$_2$, SnO$_2$, V$_2$O$_5$, B$_2$O$_3$ and Cr$_2$O$_3$, by weight, in the cast refractory product.

References Cited

UNITED STATES PATENTS

| | | | |
|---|---|---|---|
| 2,113,818 | 4/1938 | Sullivan | 106—61 |
| 2,310,591 | 2/1943 | McMullen | 106—61 |
| 3,030,228 | 4/1962 | Hernandez et al. | 106—58 |
| 3,223,758 | 12/1965 | Fischer | 106—63 |
| 3,262,795 | 7/1966 | Davies et al. | 106—58 |

JAMES E. POER, Primary Examiner

U.S. Cl. X.R.

106—57, 59, 60, 61, 62, 63